No. 693,886. Patented Feb. 25, 1902.
E. G. NEWELL.
AUTOMATIC MACHINE FOR MAKING PACKING RINGS.
(Application filed Oct. 13, 1900.)
(No Model.) 3 Sheets—Sheet 1.

Witnesses
Inventor
Edgar G. Newell
By his Attorney

No. 693,886. Patented Feb. 25, 1902.
E. G. NEWELL.
AUTOMATIC MACHINE FOR MAKING PACKING RINGS.
(Application filed Oct. 13, 1900.)
(No Model.) 3 Sheets—Sheet 2.
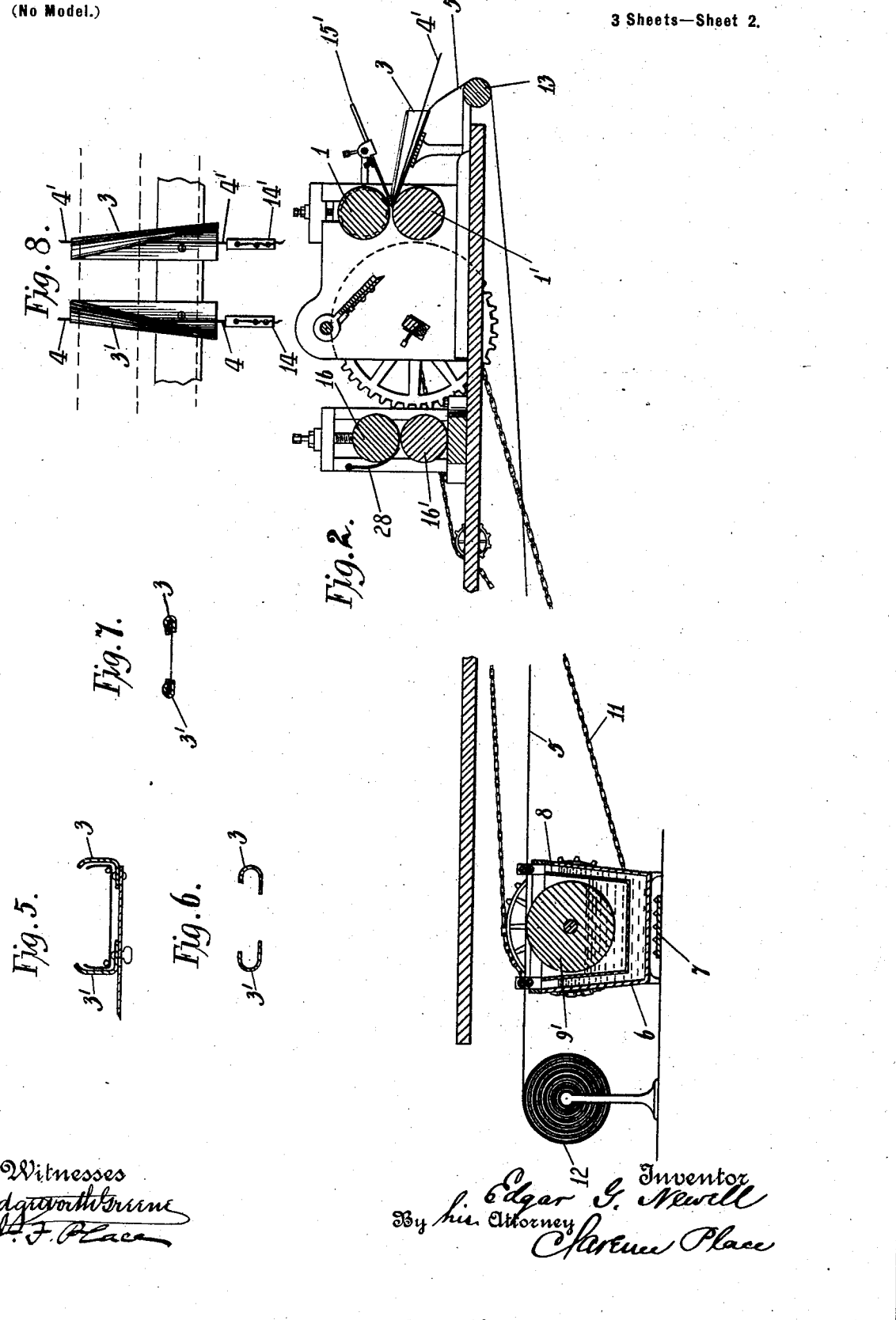

No. 693,886. Patented Feb. 25, 1902.
E. G. NEWELL.
AUTOMATIC MACHINE FOR MAKING PACKING RINGS.
(Application filed Oct. 13, 1900.)

(No Model.) 3 Sheets—Sheet 3.

Witnesses
Inventor
Edgar G. Newell
By his Attorney

UNITED STATES PATENT OFFICE.

EDGAR G. NEWELL, OF GLENRIDGE, NEW JERSEY.

AUTOMATIC MACHINE FOR MAKING PACKING-RINGS.

SPECIFICATION forming part of Letters Patent No. 693,886, dated February 25, 1902.

Application filed October 13, 1900. Serial No. 32,909. (No model.)

*To all whom it may concern:*

Be it known that I, EDGAR G. NEWELL, a citizen of the United States, and a resident of Glenridge, in the county of Essex and State of New Jersey, have invented certain new and useful Improvements in Automatic Machines for Making Packing-Rings, of which the following is a specification.

My invention relates to a new and useful improvement on machines for making paper bands or strips for bailing, clasping, or holding together pieces of cloth, dry goods, hosiery, gloves, &c.

My improvement is also adapted for use on hat-packing-ring machines as ordinarily made, thereby causing the machine to make a much stronger ring and from lighter material than otherwise.

The object of my invention is to give greater strength to the paper bands, especially on the edges, where they usually first break or tear; also, while adding to the strength, to cheapen the production by enabling the manufacturer to make a stronger band than heretofore, but from lighter material than heretofore used and to make a larger quantity in a given time. I attain these objects by the mechanism illustrated in the accompanying drawings, in which—

Figure 1:
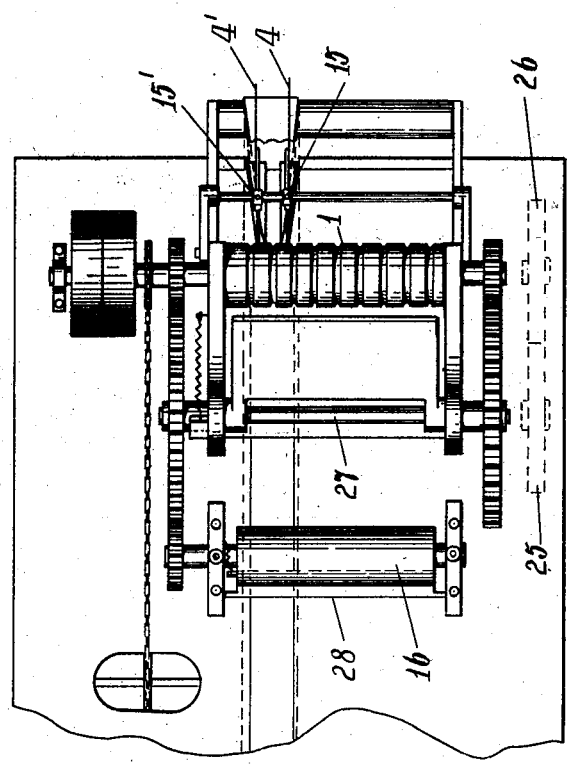
Figure 4:
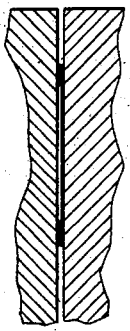
Figure 3:
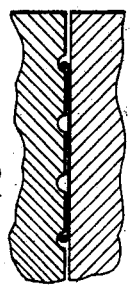
Figure 10:
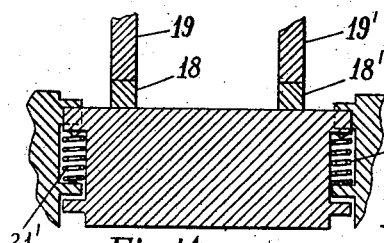
Figure 16:
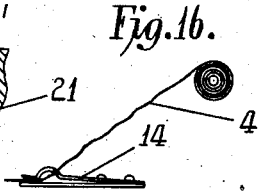
Figure 11:
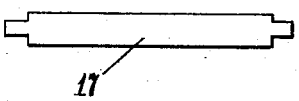
Figure 15:
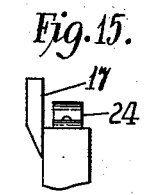
Figure 12:
Figure 13:
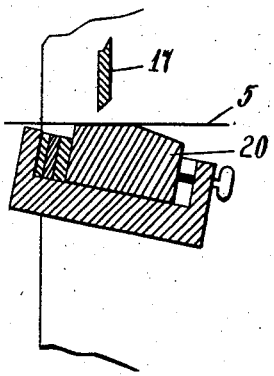
Figures 9, 14:
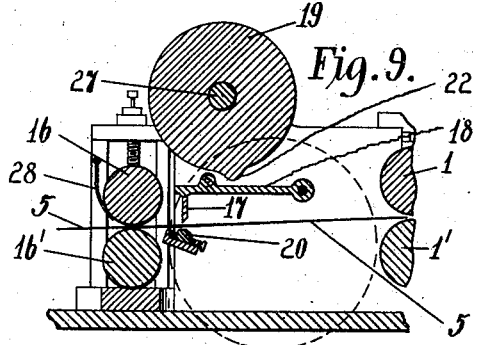
Figure 17:
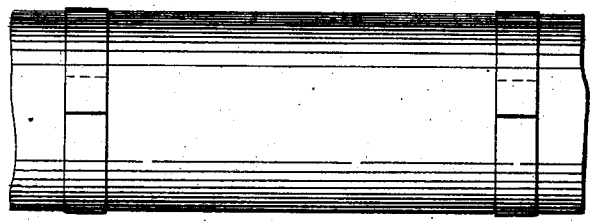

Figure 1 is a plan view of an ordinary hat-packing-ring machine fitted with my improvements, whereby it is changed into an automatic machine for making paper bands for clasping piece goods, &c. Fig. 2 is a vertical section of the same machine shown in Fig. 1 and showing my improved auxiliary flattening or finishing rollers, the automatic glue-spreading mechanism, and other parts. Fig. 3 is a vertical section lengthwise of the periphery of the two feed-pressing rollers, one of which has a smooth surface and the other having grooves thereon, whereby the glue-covered folded edge of the paper band may be pressed flat to and along the body of the band without flattening the string inclosed in the edge of the fold. The paper band is shown in cross-section between the two rollers. Fig. 4 is a similar view of the two smooth flattening or finishing rollers, with the paper band in cross-section between the rollers in process of being flattened and finished. Figs. 5, 6, 7, and 8 are different views of my improved edge-folding string-inclosing guides. Fig. 9 is a vertical section of my improved cam-actuated vertically-reciprocating knife and its operating mechanism for automatically cutting off the band in such lengths as desired. This is an improvement on the old-style rotating knife and toggle-bed shown in Fig. 2. Figs. 10, 11, 12, and 13 are different views of the same. Figs. 14 and 15 are modifications in construction of the above knife, showing the blade fitted up for shearing off the bands instead of cutting on a rawhide block. Fig. 16 is a side view of one of the tension-springs for regulating tension on the thread which goes in the fold of the band. Fig. 17 shows a piece of goods bound or clasped with two of my improved paper bands.

Similar reference-marks refer to similar parts throughout the several drawings.

1 is the grooved feed-roller, and 1' the smooth feed-roller. These two rollers take the paper band (which is supplied from a reel 12 or otherwise) after it has passed through the guides 3 and 3'. These guides act as edge-folding and string-inclosing pieces, for they fold the edges of the band 5 over the strings 4 and 4'. (See Fig. 8.) The mouth or front of the guides is shaped as shown in Fig. 5, the outlet as shown in Fig. 7, and the full shape as shown in Fig. 8. The paper band as it passes into the guides turns up around the strings, as in Fig. 5, and as it leaves the guides is completely folded, as shown in Fig. 7, when it passes under the pressure-blades 15 and 15' between the rollers 1 and 1'.

At 6 is shown the gluing mechanism, which consists of an ordinary water-holder 6, warmed by the gas-jets 7, and the inside glue box or tank 8. Two wheels 9 and 9' (adjustable on the shaft 10) are so set that the lower side is at all times submerged in the glue-tank 8. These wheels are operated by the chain belt 11, and the paper band passes over the top of the wheels, as shown in Fig. 2. The wheels are so adjusted on the shaft 10 relative to the reel 12 that the two edges are well distributed with glue. The wheels 9 and 9' not only deliver a uniform quantity of liquid glue to each of the edges of the bands, but deliver it on the same side and of uniform width on each edge of the band. As the band is fed to the rollers 1 and 1' it first passes under the machine after having the edges covered with liquid glue and goes over the roller 13, after which the glue side is uppermost, and it is ready to enter the guides 3 and 3'. Here it receives the thread or strings 4 and 4', which are kept at a slight tension by the tension-pieces 14 and 14'. As the band passes into the guides the edges are turned over in the same and come out, as shown at Fig. 7, folded over the strings. The fold is further formed and pressed down on the smooth roller 1' by the tension-plates 15 and 15'. The band 5, the edges folded over the strings, now enters between the two feed-pressing rollers 1 and 1', one of said rollers, 1', having a smooth surface and the other, 1, having grooves thereon, whereby the glue-covered folded edges of the band are pressed flat to and along the body of the band without flattening the string inclosed in the edge of each fold, for that part of the fold inclosing the string in each side is held in the grooves, as shown in Fig. 3, and escapes pressure.

At 16 and 16' I have a pair of smooth flattening or finishing rollers for the purpose of receiving and flattening or finishing the band and delivering same from the machine as cut. These rollers serve an important purpose, for they flatten the edges with the thread therein after the glue has set in the folds, and the strings are confined therein close to the outside edges, as shown in Fig. 3, thus giving a finish to the band without crowding the thread away from the outside edge in the fold.

In Figs. 9, 10, 11, 12, and 13 I show my improved mechanism for cutting the bands as made, 17 being a vertically-reciprocating knife-blade, which is operated by the levers 18 and 18' and the cams 19 and 19'. The blade is held up away from the rawhide cutting-block 20 by the two spiral springs 21 and 21' and is forced down suddenly by the projections 22 acting on the trucks 23. A modification is shown of this reciprocating knife in Figs. 14 and 15, wherein the edge of the knife passes a steel block and shears off the band, the band being held for the purpose against the guide 24. By the use of different sizes of gears, as shown at 25 and 26, Fig. 1, the speed of the cams 19 and 19', and consequently the speed of the vertically-reciprocating knife, may be regulated to run fast or slow relative to the speed of the machine, so that the paper bands may be cut off at any predetermined length desired. In Figs. 1 and 2 the old-style rotating knife of a hat-packing-ring machine is shown, so as to show how my other improvements as herein shown may be adapted to such machines; but my vertically-reciprocating knife and parts necessary thereto can be also adapted to such machines by fixing the cams 19 and 19' to the shaft 27, (see Fig. 1,) as shown in Fig. 9.

At 28 I show a fender or blade which presses against the roller 16 to prevent the ends of the bands from sticking to the roller.

I am aware that folded-edge hat-packing rings are made on automatic machines having a pair of grooved rollers. Those rollers are grooved differently from mine, and both rollers are grooved, the grooves engaging each other in operation, while I have only one roller grooved, and the groove is round in the bottom, not square. The edges of rings made on machines with two grooved rollers are easily torn, however, and not being glued easily lose their shape. My rings as made with my improved machine, it will be noticed, have a string (either of linen, cotton, hemp, or shoemakers' thread) running along each edge within the folded part, which makes the band very strong, even when made of very light-weight paper. The folded edges are glued together very smoothly and tightly, as shown in Fig. 3, and by reason of the grooves in the upper feed-roller and the smoothness of the faces of the lower roller and the spaces between the grooves in the upper roller the string is forced into a tube, as it were, close to the outer edge of the fold, which tube rests in the grooves on each side, (see Fig. 3,) the surplus glue around the string being squeezed into the tube and serving the purpose of wax to shoe-thread, making it considerably stronger. Then as the band passes between the finishing or flattening rollers the glued part of the fold has become set and the rollers flatten and smooth the tubular edge with the string therein very nicely, as shown in Fig. 4, without crowding the strings inwardly from the edge. Bands made in this way are of uniform width the whole length and as strong as linen and much neater in appearance.

Another important advantage is that the bands being flat and smooth the ends are readily pasted together when used for clasping goods, as shown in Fig. 17, which is very difficult with bands made in the old way having projecting or double-folded edges.

Having thus described my invention, what I claim as new and original, and desire to secure by Letters Patent, is—

1. In a machine of the class described for making packing-rings, the combination of two feed-rollers geared together, one of which being smooth and the other having grooves thereon, whereby the glue-covered folded edge of the paper band for making rings may be pressed flat to said grooved rollers and along the body of the same without flattening the string inclosed in the edge of the fold; with two edge-folding string-inclosing guides; a pair of smooth finishing-rollers geared together and adapted to receive and flatten the said string-inclosed folded edges, and deliver said finished band from the machine; and means for delivering a uniform quantity of liquid glue to and covering a uniform width on each of the edges of said paper band on one side thereof before it passes into the aforesaid guides, substantially as shown and described.

2. In a machine of the class described for making packing-rings, the combination of two feed-rollers geared together, one of which being smooth and the other having grooves thereon, whereby the glue-covered folded edge of the paper band for making rings may be pressed flat to said grooved rollers and along the body of the same without flattening the string inclosed in the edge of the fold; with two edge-folding string-inclosing guides; a pair of smooth finishing-rollers geared together and adapted to receive and flatten the said string-inclosed folded edges, and deliver said finished band from the machine; a knife for cutting the bands located between the said two pairs of rollers, and having means for varying the speed thereof relative to the speed of said feed-rollers, substantially as shown and described.

3. In a machine of the class described for making packing-rings, the combination of two feed-rollers geared together, one of which being smooth and the other having grooves thereon, whereby the glue-covered folded edge of the paper band for making rings may be pressed flat to said grooved rollers and along the body of the same without flattening the string inclosed in the edge of the fold; with two edge-folding string-inclosing guides; a pair of smooth finishing-rollers geared together and adapted to receive and flatten the said string-inclosed folded edges; and deliver said finished band from the machine; and a knife for cutting the bands, located between the said two pairs of rollers and having means for varying the speed thereof relative to the speed of said feed-rollers, and means for delivering a uniform quantity of liquid glue to and covering a uniform width on each of the edges of said paper band on one side thereof before it passes into the aforesaid guides, substantially as shown and described.

Signed at New York, in the county of New York and State of New York, this 11th day of October, A. D. 1900.

EDGAR G. NEWELL.

Witnesses:
WM. S. FRYE,
A. R. TURNER.